United States Patent
Heinz

(10) Patent No.: US 7,524,145 B2
(45) Date of Patent: Apr. 28, 2009

(54) METHOD AND DEVICE FOR THE PNEUMATIC TRANSPORT OF PREFERABLY LINEN

(75) Inventor: Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 10/504,482

(22) PCT Filed: Feb. 20, 2003

(86) PCT No.: PCT/EP03/01770

§ 371 (c)(1), (2), (4) Date: Apr. 6, 2005

(87) PCT Pub. No.: WO03/070611

PCT Pub. Date: Aug. 28, 2003

(65) Prior Publication Data

US 2005/0175420 A1    Aug. 11, 2005

(30) Foreign Application Priority Data

Feb. 20, 2002 (DE) .............. 102 08 178

(51) Int. Cl.
*B65G 51/02* (2006.01)
(52) U.S. Cl. .................................. 406/116
(58) Field of Classification Search ............ 406/11, 406/19, 23, 24, 30, 113, 114, 116; 209/537, 209/552, 592, 905
See application file for complete search history.

(56) References Cited

U.S. PATENT DOCUMENTS

| | | | |
|---|---|---|---|
| 3,208,800 A | 9/1965 | Boon | |
| 3,469,931 A | 9/1969 | Boon | |
| 3,951,461 A * | 4/1976 | De Feudis | 406/3 |
| 4,076,321 A * | 2/1978 | Haight et al. | 406/117 |
| 4,436,457 A * | 3/1984 | Willingham | 406/116 |
| 4,566,615 A * | 1/1986 | Nakahira | 223/43 |
| 5,060,399 A | 10/1991 | Engel | |
| 5,165,355 A * | 11/1992 | Fournier et al. | 112/470.08 |
| 5,403,128 A * | 4/1995 | Thomas | 406/39 |
| 5,456,392 A * | 10/1995 | Majors | 223/112 |
| 5,513,782 A * | 5/1996 | Rosso | 223/1 |
| 5,641,250 A * | 6/1997 | Bostelmann et al. | 406/11 |
| 5,709,506 A * | 1/1998 | Beard et al. | 406/1 |
| 5,806,397 A * | 9/1998 | Mendenhall | 83/402 |
| 5,884,822 A | 3/1999 | Migliorini | |
| 5,992,712 A * | 11/1999 | Nishikawa et al. | 223/1 |
| RE36,584 E * | 2/2000 | Harkonen et al. | 15/314 |
| 6,619,525 B2 * | 9/2003 | Frankeburger et al. | 226/7 |
| 6,655,890 B1 * | 12/2003 | Weir | 414/13 |
| 6,786,692 B2 * | 9/2004 | Manini | 414/13 |

FOREIGN PATENT DOCUMENTS

DE    27 38 180 A    3/1978
DE    29 18 125 A    11/2007

* cited by examiner

*Primary Examiner*—Douglas A Hess
(74) *Attorney, Agent, or Firm*—Laurence P. Colton; Smith, Gambrell & Russell

(57) ABSTRACT

A process and apparatus for separating or disentangling plugs of laundry by raising them after being picked up by the suction head (12) and briefly interrupting the suction operation. Venting of the suction head (12) which takes place in the process results in the plug of laundry (28) falling back onto the pile of laundry (38). This gives rise to the plug of laundry being automatically "forced apart", whereupon the pneumatic conveyor can be automatically loaded with laundry by the suction head (12).

9 Claims, 6 Drawing Sheets

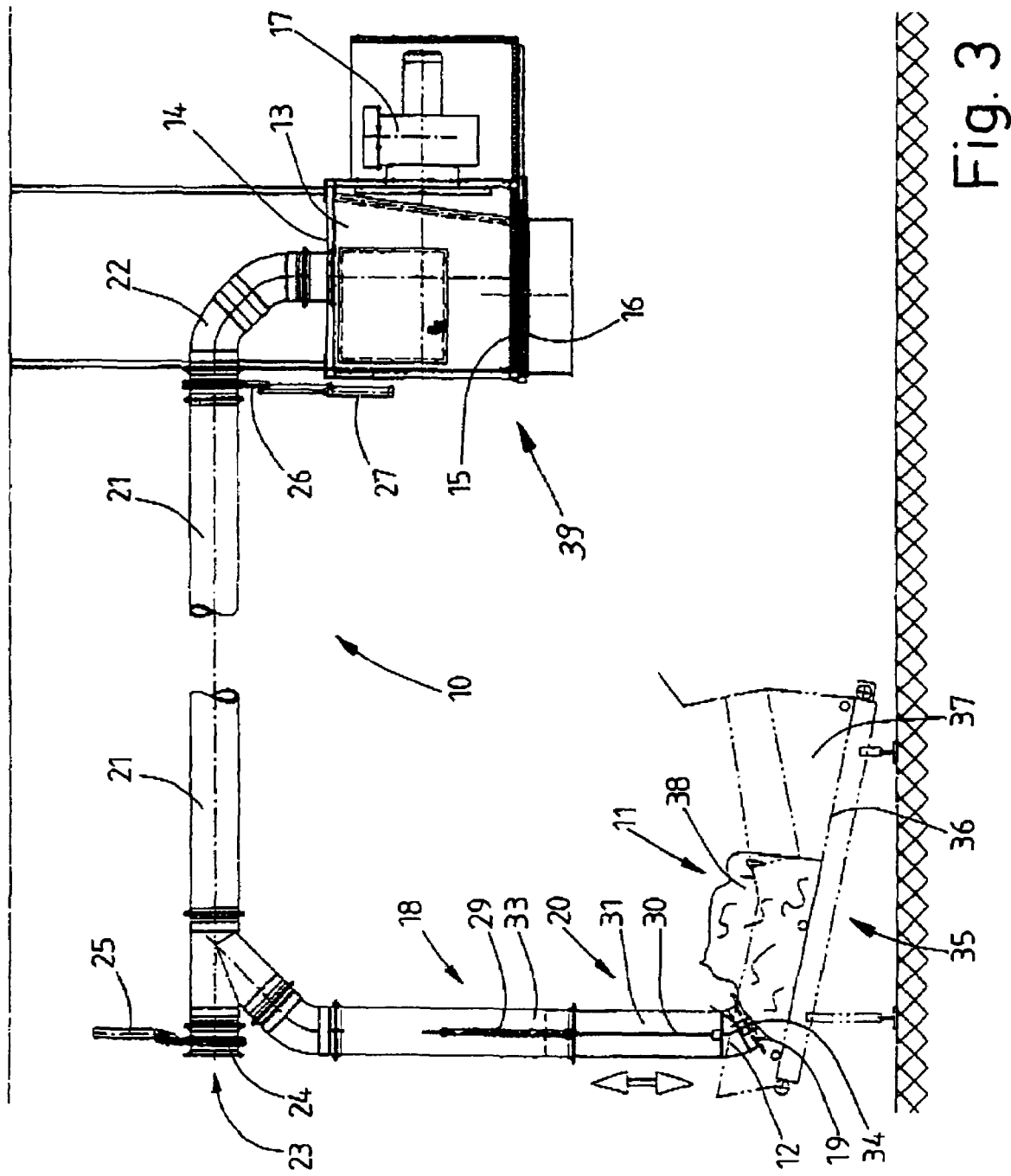

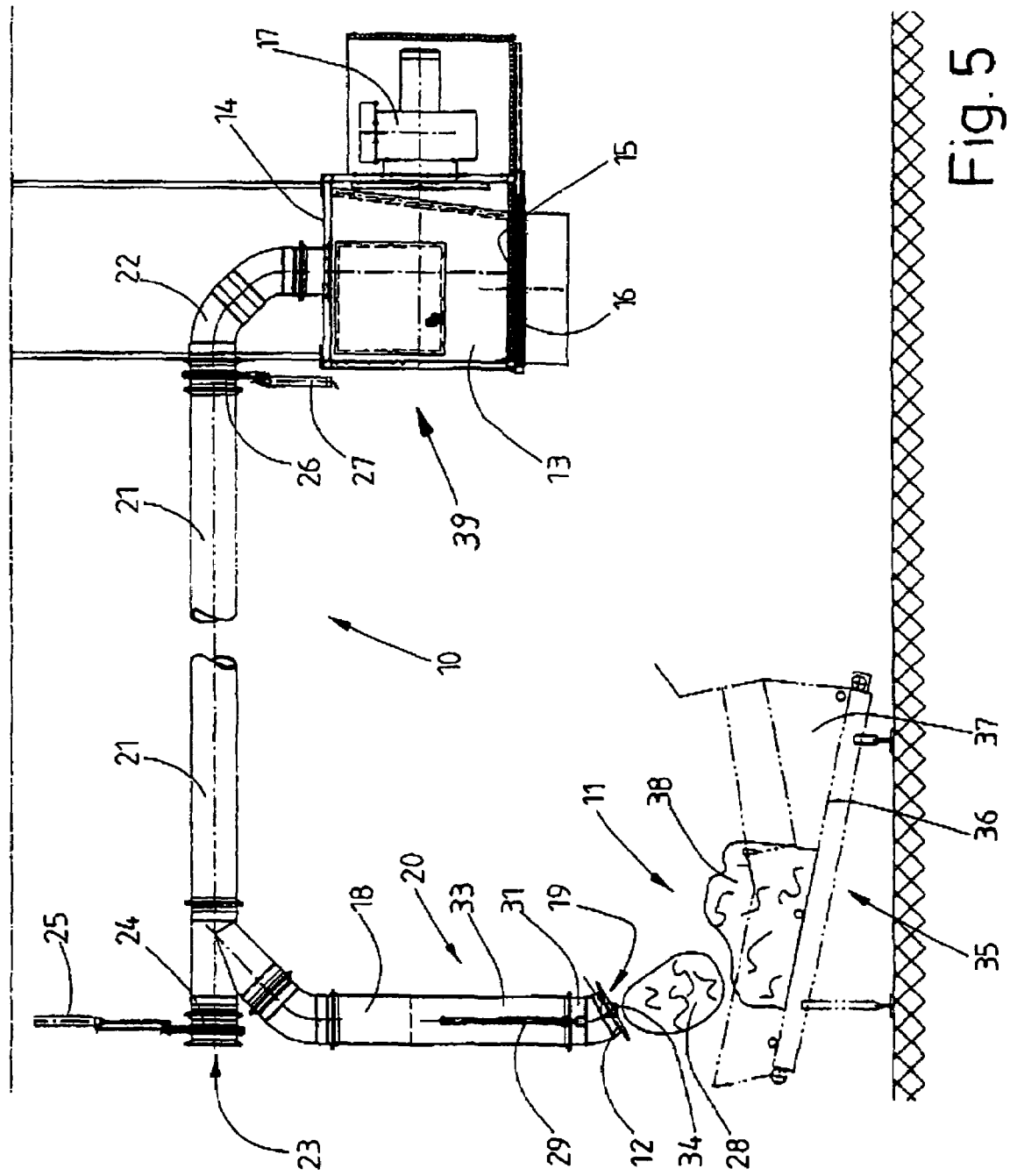

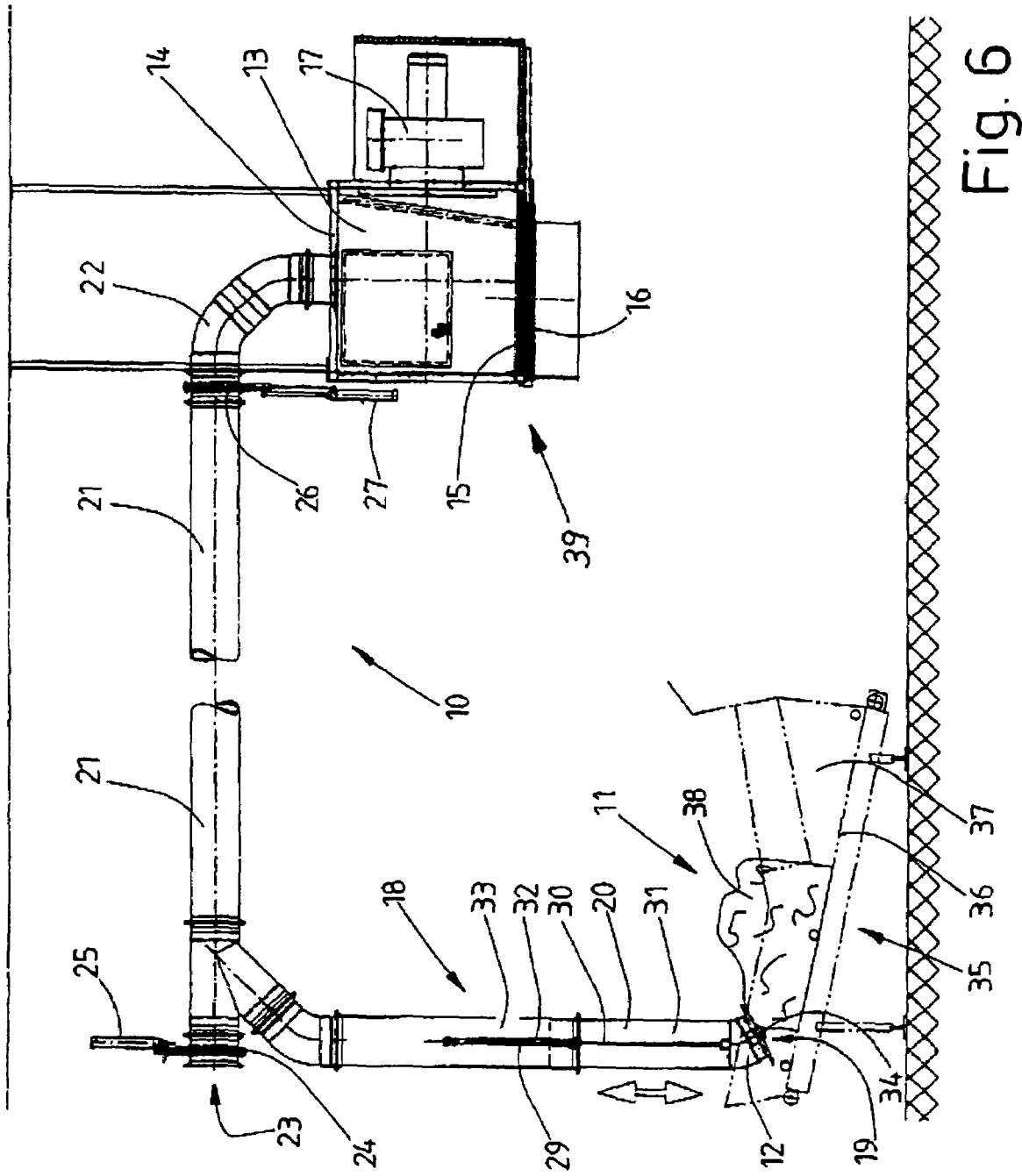

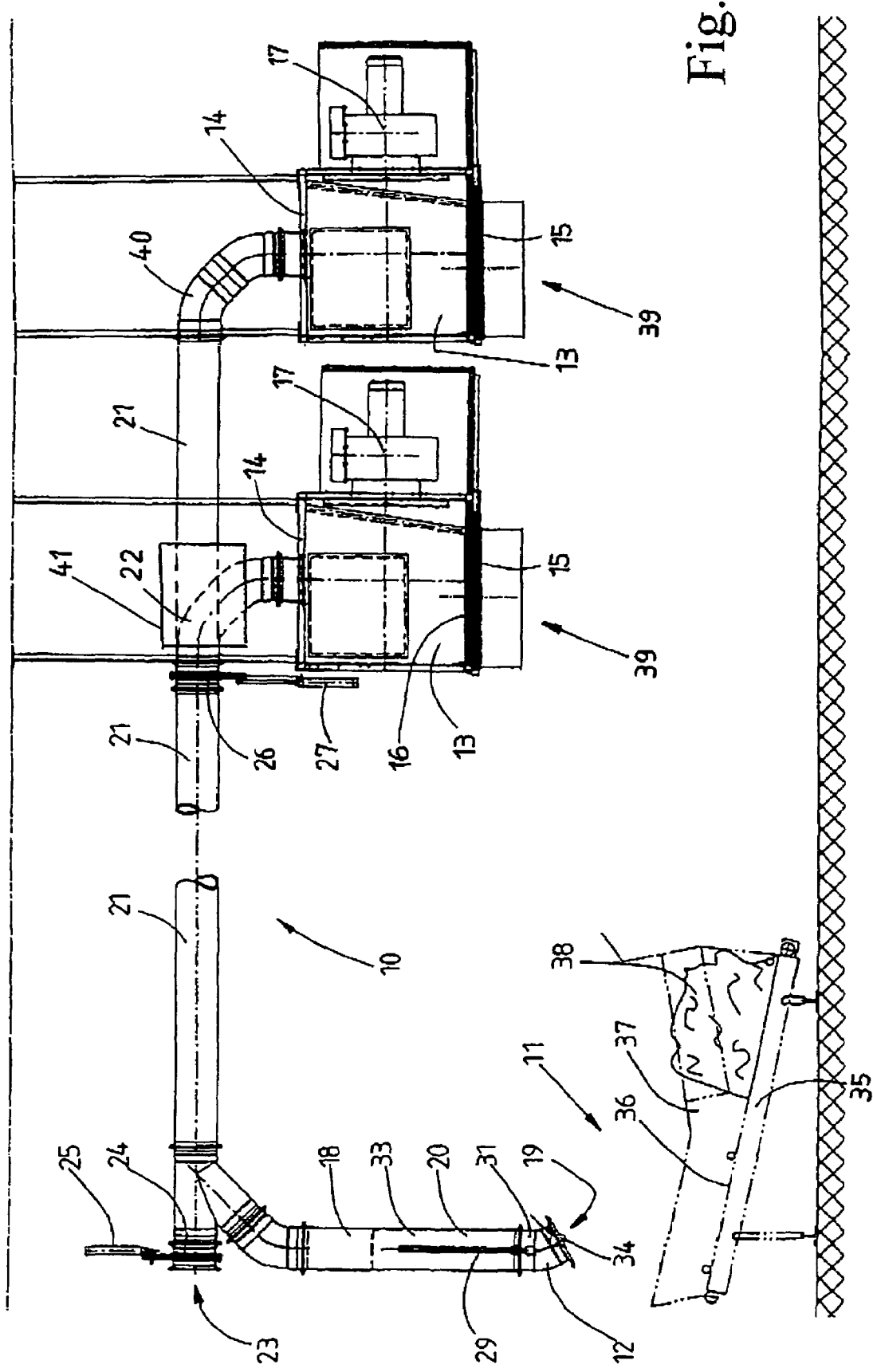

METHOD AND DEVICE FOR THE PNEUMATIC TRANSPORT OF PREFERABLY LINEN

STATEMENT OF RELATED APPLICATIONS

This patent application is the United States of America Patent Cooperation Treaty (PCT) Chapter II National Phase application of PCT International Application No. PCT/EP03/01770 having an International Filing Date of 20 Feb. 2003 and which designates the United States of America, which claims priority on German patent application 102 08 178.6 having a filing date of 20 Feb. 2002.

BACKGROUND OF THE INVENTION

1. Technical Field

The invention relates to a process for pneumatically conveying preferably laundry by loading a pneumatic conveyor with preferably laundry, the laundry or the like being picked up by a suction head from a supply, in particular a pile of laundry. The invention also relates to an apparatus for pneumatically conveying preferably laundry having at least one suction head, at least one adjoining tubular conveying section and at least one air-flow generator, or having at least one suction head and at least one adjoining tubular conveying section.

2. Prior Art

In industrial laundries, laundry is conveyed to a first treatment station or else between successive treatment stations, inter alia, pneumatically. The laundry is constituted by items of laundry, for example bedding, table linen, towels or the like, but also items of clothing. The laundry can be conveyed pneumatically both in the unwashed state, that is to say when still dry, and once it has been laundered when still damp.

The laundry passes to the pneumatic conveyor usually as a pile of laundry with a multiplicity of items of laundry. In order to load the conveyor, a suction head picks up the laundry. Since the individual constituent parts of the laundry are often entangled in the pile of laundry, the suction head occasionally picks up such a large number of entwined items of laundry that the latter block the suction head. A plug of laundry then forms, in practice, in front of the suction head. This results in disruption during loading of the pneumatic conveyor. It is thus customary, in practice, for pneumatic conveyors to be manually loaded with laundry, operators disentangling the individual items of laundry in the pile of laundry to the extent where it is not possible for any suction-head-blocking plugs of laundry to form. This manual loading adversely affects the efficient use of pneumatic conveyors in laundries in particular.

Taking the above as a departure point, the object of the invention is to provide a process for pneumatically conveying, in particular, laundry automatically and without disruption, and also to provide a corresponding apparatus.

BRIEF SUMMARY OF THE INVENTION

A process for achieving this object has the features of loading a pneumatic conveyor with preferably laundry, the laundry or the like being picked up by a suction head from a supply, in particular a pile of laundry, wherein, when an excessively large quantity of laundry for further transportation through the conveyor is picked up, the suction operation is interrupted and then continued again. Since the suction operation is interrupted in the case of a plug of laundry being formed in front of the suction head, the closure of the suction head by the plug of laundry is eliminated again by the plug of laundry being released again from the suction head. Surprisingly, it has been found that the plug of laundry breaks up in the process. As a result of the pick-up operation being interrupted in the case of the suction head being closed by a plug of laundry, the latter is separated or broken up pneumatically. It may be said here that the plug of laundry is "forced apart" pneumatically. When picked up again, the laundry, in particular a batch of laundry comprising a plurality of items of laundry, can then pass through the suction head and be conveyed away pneumatically by way of the conveying section. In the case of large plugs of laundry or laundry which is entangled to a pronounced extent, it may be necessary for the plug of laundry to be repeatedly picked up and released from the suction head again until the laundry breaks up to the extent where it can be conveyed away pneumatically. This also ensures reliable automatic loading of the pneumatic conveyor.

The suction operation is preferably only interrupted when a plug of laundry forms in front of the suction head. As long as the laundry or a batch of laundry can be picked up without an excessively large plug being formed, virtually continuous automatic loading of the pneumatic conveyor with laundry takes place. It is only when a plug of laundry which cannot be picked up, and taken in, as a whole forms in front of the suction head that it is necessary to interrupt the suction operation. A brief interruption in the suction operation is sufficient for this purpose, with the result that the conveying stream is not interrupted to any significant extent. In order for it always to be possible to discharge laundry on the discharge side of the pneumatic conveyor, provision may be made for at least one collecting container serving for the (buffer) storage of the laundry to be provided, this collecting container always containing a supply of laundry, with the result that, even when the operation of picking up the laundry on the suction head is interrupted briefly in order to eliminate plugs of laundry, items of laundry can be discharged, in accordance with requirements, to a treating arrangement on the discharge side of the pneumatic conveyor. It is also conceivable for the laundry picked up to be guided in circulation, for example by continuous pneumatic conveying. The circulatory conveyor then forms, in practice, the (buffer) store.

According to a preferred configuration of the process, the plug of laundry which is picked up by the suction head is first of all raised by the suction head before, as a result of a brief interruption in the supply of suction air to the suction head, the plug of laundry is released from the suction head. The plug of laundry is thus allowed to fall from the suction head, as a result of which it is broken up and/or separated in an effective and reliable manner. It is thus also possible for plugs of laundry comprising items of laundry which are entwined and entangled to a pronounced extent to be separated reliably, by being detached and falling off the suction head, such that, during the next pick-up operation, the plug of laundry has been divided up to the extent where it can pass through the suction head.

The operation of raising the suction head closed by a plug of laundry preferably takes place using separate and/or external lifting and/or drive elements, for example pressure-medium cylinders. It is also conceivable, however, to have a pneumatic raising operation, preferably such that the negative pressure in the conveyor, which is established in the case of the suction head being closed by a plug of laundry, is utilized in order to raise the suction head with the plug of laundry. The subsequent release of the plug of laundry from the suction head easily takes place by virtue of the suction operation being interrupted and preferably also by virtue of at least the suction head, preferably part of the tubular conveying section, having air admitted to it. The suction head is then lowered onto the laundry again, with the result that it can subsequently pick up the laundry of the separated plug of laundry in order for the pneumatic conveyor to be loaded automatically.

An apparatus for achieving the object mentioned in the introduction has at least one suction head, at least one adjoining tubular conveying section and at least one air-flow generator, wherein, in the case of being closed by the laundry, the suction head can be raised and separated from the laundry. Since the suction head, in the case of being closed by a plug of laundry, can be raised and released from the plug of laundry, rather than just blockage of the suction head being eliminated automatically, the action of the plug of laundry being detached from the suction head and being allowed to fall results in this plug of laundry being automatically separated or broken up. It is usually then possible, during a subsequent new suction operation, for the laundry to be picked up without disruption and for the pneumatic conveyor thus to be loaded. Any possible disruption to the loading operation by a plug of laundry is thus eliminated automatically, without manual aid, and reliable automatic loading of the pneumatic conveyor is therefore ensured.

According to a preferred development of the apparatus, provision is made for it to be possible to interrupt the supply of suction air at least to the suction head. A plug of laundry which closes the suction head can thus be removed automatically from the suction head.

In order that a plug of laundry can be released relatively rapidly from the suction head, provision is additionally made, according to a development of the apparatus, for at least the suction head to have air admitted to it as required. The negative pressure which retains the plug of laundry on the suction head is thus eliminated abruptly, which assists in the plug of laundry being reliably split up or separated in that the plug of laundry can be, as it were, "forced apart" pneumatically.

Provision is made, according to a preferred development of the apparatus, for the tubular conveying section to be assigned a collecting container. The collecting container is preferably located at the opposite end of the tubular conveying section, located downstream of the suction head, to be precise downstream of an apparatus for ejecting the laundry, in particular the batches of laundry, from the tubular conveying section. The collecting container serves here as a laundry store. The laundry can be stored on an interim basis in the collecting container and can be discharged from the latter, as required, to, for example, a subsequent arrangement for processing the laundry. In particular, it is possible to compensate for a non-uniform laundry stream in the case of discontinuous automatic loading of the pneumatic conveyor during elimination of plugs of laundry, with the result that, if appropriate, continuous loading of a subsequent processing machine with laundry is ensured even if the loading operation takes place discontinuously, at least on a temporary basis, as a result of plugs of laundry.

According to a preferred configuration of the apparatus, at least one sensor or some other sensing element is provided for sensing the height of the pile of laundry. This sensor is preferably assigned to the underside of the suction head. By virtue of the height of the pile of laundry being sensed, the suction head is moved up carefully to the pile of laundry by, for all practical purposes, sensing its way up to the laundry. This ensures that the laundry is not forced into the suction head, thus blocking the latter to the extent where, when the suction operation is interrupted, it is no longer possible for the plug of laundry to be automatically released from the suction head; rather, the suction head merely picks up the laundry, which reduces the risk of the suction head being blocked by plugs of laundry.

A further process for achieving the object mentioned in the introduction, it also being possible for this process to be a development of the process described above, with the laundry or the like being picked up by a suction head from a supply, in particular a pile of laundry, and being transported further along a tubular conveying section, wherein the laundry is divided up over the course of the tubular conveying section. Accordingly, provision is made for the laundry to be divided up over the course of the tubular conveying section. In this way, the laundry can be ejected from the tubular conveying section in batches at different locations. It is thus possible, using a single tubular conveying installation, for a plurality of subsequent laundry machines or laundry-treating machines to be supplied simultaneously with laundry. The conveying capacity of the tubular conveying installation can thus be utilized to better effect.

According to a preferred development of the process, provision is made for the laundry to be picked up in batches and for the batches of laundry to be directed in a specific manner as required, over the course of the tubular conveying section, to different portions of the tubular conveying section, in particular different ejecting arrangements. The batches of laundry transported through the tubular conveying section are thus divided up between different discharge locations of the ejecting arrangement. It is thus possible for two or even more ejecting arrangements to be optionally supplied with individual batches of laundry, to be precise preferably in a specifically controlled manner, from the same tubular conveying section. The process thus also allows the batches of laundry to be sorted by it being possible for the latter to be transported specifically to different discharge locations downstream of the respective ejecting arrangement.

An apparatus for achieving the object mentioned in the introduction, it also being possible for this apparatus to be a preferred development of the apparatus described above, has at least one suction head and at least one adjoining tubular conveying section, wherein the tubular conveying section is assigned a plurality of ejecting arrangements. Accordingly, the tubular conveying section has a plurality of, to be precise at least two, ejecting arrangements. The ejecting arrangements may be of identical or different design. The critical factor is for the laundry, in particular batches of laundry, to pass in a specifically controlled manner, by way of this apparatus, from the tubular conveying section to different discharge locations downstream of the ejecting apparatuses in order, from there, to be treated further at a number of identical or different laundry-treating arrangements.

According to a preferred development of the apparatus, provision is made for the tubular conveying section to be assigned at least one switch-over diverter for feeding the laundry or batches of laundry in a specific manner, as required, to the respective ejecting arrangement. The laundry is thus distributed in the manner of a "shunting station" by the apparatus to different discharge locations downstream of the respective ejecting arrangement.

Further subclaims relate to expedient developments of the processes and apparatuses.

BRIEF DESCRIPTION OF THE DRAWINGS

Preferred exemplary embodiments of the apparatuses and processes are explained in more detail hereinbelow with reference to the drawing, in which:

FIG. 3 shows a schematic side view of the apparatus in a suction position, FIG. 5 shows a schematic side view of the apparatus with the plug of laundry released from the suction head, FIG. 6 shows a schematic side view of the apparatus during the operation of picking up a plug of laundry which has been broken up, and FIG. 7 shows an alternative exemplary embodiment of the apparatus in an illustration analogous to FIG. 1.

DETAILED DESCRIPTION OF THE PREFERRED EMBODIMENTS

Figure 1:
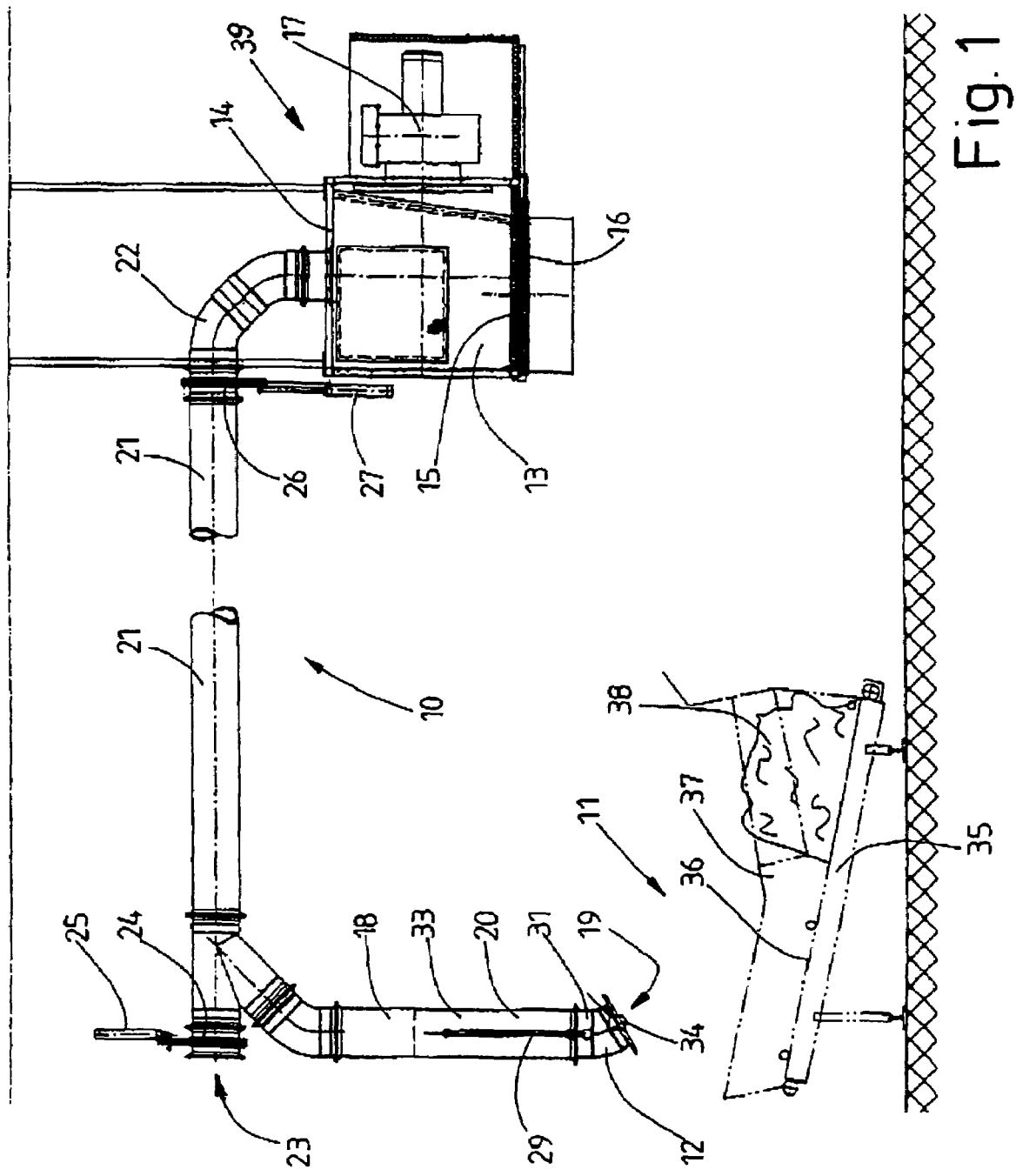
FIG. 1 shows a schematic illustration of an apparatus in a starting position.

The apparatus shown here is a pneumatic conveyor by means of which laundry is transported, in particular in batches, within preferably a laundry. The laundry may be dry or wet laundry of any type, for example table linen, bedding, towels, items of clothing and/or work clothing. From the pneumatic conveyor, the laundry is transported, for example, to a washing machine, a drier and/or a machine for introducing it into a mangle.

The pneumatic conveyor has a tubular conveying section 10, which is only partially illustrated in the figures and is intended for forming a conveying section over an appropriate course and of the necessary length. An automatic loading station 11 is located at the start of the pneumatic conveyor. In the region of the loading station 11, the pneumatic conveyor has a suction head 12 which forms the start of the tubular conveying section 10, as seen in the conveying direction. A (single) ejecting arrangement 39 in the manner of a compressed air lock is located at the end of the tubular conveying section 10, in the case of the pneumatic conveyor shown in FIGS. 1 to 6. In the exemplary embodiment shown, the ejecting arrangement 39 is assigned a collecting container 13, it also being possible to provide an accommodating arrangement instead of the collecting container 13. The collecting container 13 may be a constituent part of the ejecting arrangement 39, although it may also be arranged downstream of the latter. The end of the tubular conveying section 10 opens out into a top covering wall 14 of the ejecting arrangement 39. The base of the collecting container 13 has an opening 15 preferably over the entire surface area. This opening 15 can be closed, to be precise, in the exemplary embodiment shown here, by a slide 16. Located alongside the ejecting arrangement 39 is an air-flow generator designed, for example, as a fan 17. The fan 17 is operated such that it takes in air from the ejecting arrangement 39 and from the tubular conveying section 10 connected thereto. A suction-air stream for forming a negative pressure is thus also generated in the suction head 12. A side wall of the ejecting arrangement 39 which is oriented toward the fan 17 is preferably of air-permeable design over the entire surface area, for example in the form of a close-meshed screen. The laundry is thus preferably held back in the collecting container 13, with the result that it cannot pass into the fan 17.

Figure 2:
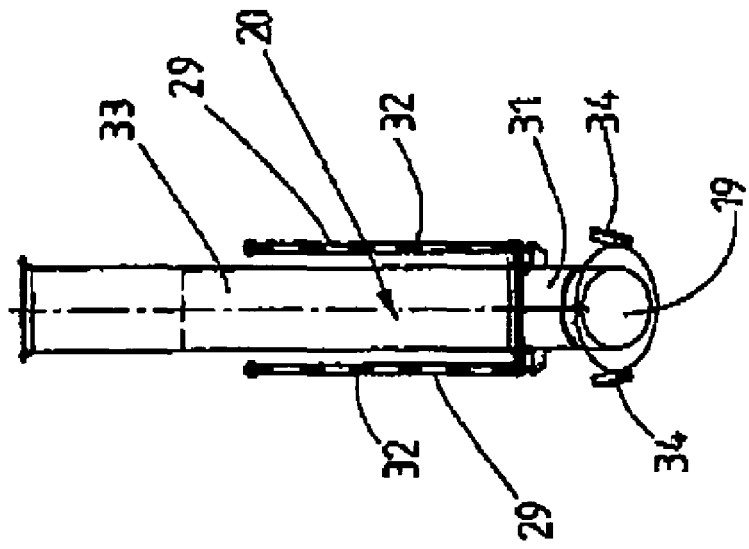
FIG. 2 shows a view of the apparatus in the region of a suction head in the starting position from FIG. 1.
Figure 4:
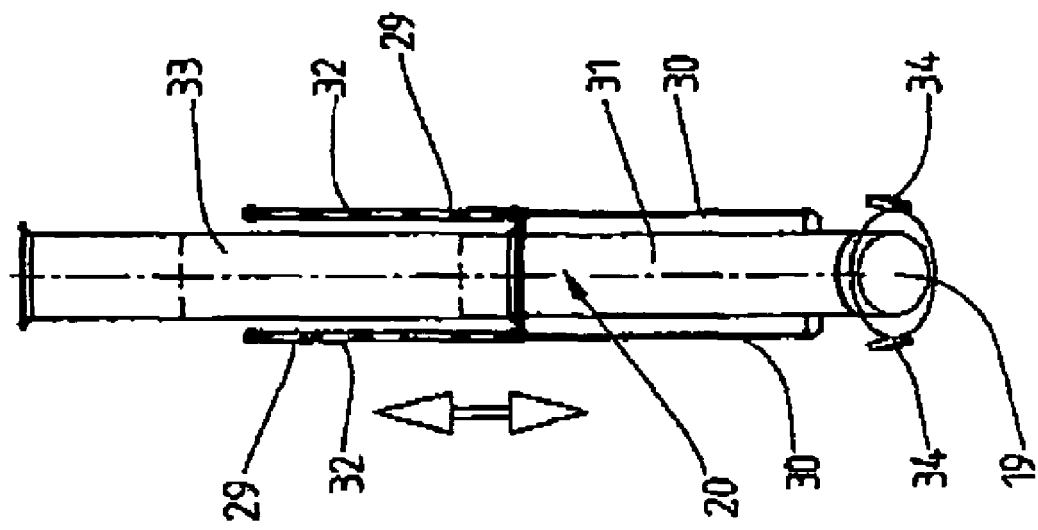
FIG. 4 shows an illustration of the apparatus in the region of the suction head in the suction position from FIG. 3.

The suction head 12 is arranged at the bottom end of a vertical portion 18 of the tubular conveying section 10, to be precise, in the exemplary embodiment shown, with an obliquely directed suction opening 19. FIGS. 2 and 4 show a circular suction opening 19. However, it is also possible for the suction head 12 to have a suction opening with any other desired, for example oval, cross sections. It is likewise possible for the suction head 12 to have a plurality of suction openings of any desired cross sections. The vertical portion 18 of the tubular conveying section 10 is designed, at least in the bottom region, as a pneumatically actuated telescopic tube 20. The suction head 12 can thus be moved up and down pneumatically. The vertical portion 18 of the tubular conveying section 10 opens out, at its (top) end directed away from the suction head 12, into a main portion 21 of the tubular conveying section 10. This main portion 21, which is only partially illustrated in the figures, may run over any desired course, to be precise it is adapted to the local conditions and the conveying route which the laundry has to negotiate. The opposite end regions of the main portion 21 which are shown here run over an approximately horizontal course. The rear end region of the main portion 21, this end region being oriented toward the ejecting arrangement 39, is adjoined by a connecting portion 22, which connects the main portion 21 of the tubular conveying section 10 to the ejecting arrangement 39.

At the location where the vertical portion 18 of the tubular conveying section 10, the vertical portion having the suction head 12, is connected to the main portion 21, the main portion 21 has an end connector with a venting opening 23. The venting opening 23 can be closed by a slide 24. In the exemplary embodiment shown, the slide 24 can be actuated by a pneumatic cylinder 25, namely in order to be opened and closed again as required.

At the end which is oriented toward the ejecting arrangement 39 with the collecting container 13, the main portion 21 of the tubular conveying section 10 has a shut-off slide 26, which can likewise be opened and closed by a pneumatic cylinder 27.

The suction head 12 is assigned at least one detector 42 which generates a signal when the suction opening 19 of the suction head 12 is closed by the laundry, that is to say the quantity of entangled items of laundry which has been picked up does not fit through the suction opening 19 of the suction head 12. It Is possible here to speak in terms of a plug of laundry 28 which closes the suction head 12 (FIG. 5). For example, the detector can detect the negative pressure which then builds up at least in the telescopic tube 20. This negative pressure can also be used to operate two pneumatic cylinders 29 arranged on opposite sides of the telescopic tube 20. Retractable and extensible piston rods 30 of the pneumatic cylinders 29 are fixed to a tube 31 of the telescopic tube 20, it being possible for the tube 31 to be moved up and down. The pistons 32 of the pneumatic cylinders 29 are fixed to a bottom end of a stationary tube 33 of the telescopic tube 20 (FIGS. 2 and 4).

In each case one reflection sensor 34 is arranged on opposite sides of the opening 15 of the suction head 12 (FIGS. 2 and 4). This arrangement is such that the viewing direction of each reflection sensor 34 is oriented downward in the direction of the laundry.

The laundry which is to be transported further, preferably as batches of laundry, by the pneumatic conveyor is conveyed up into the region of the suction head 12, to be precise by any desired continuous conveyors, for example belt conveyors, chutes or the like. It is also possible, however, for the laundry to be supplied discontinuously, for example in laundry carts or on turntables, in the region of the suction head 12. In the figures, the suction head 12 is assigned a loading conveying 35 indicated by chain-dotted lines. The loading conveyor 35 is assigned to one end of any desired other conveying section. In the exemplary embodiment shown, a top strand 36 of the loading conveying 35 is assigned a hopper 37 formed by parallel side walls and an end wall. In the region of this hopper 37, the laundry conveyed up to the loading station 11 collects just beneath the suction head 12. The laundry here is a pile of laundry 38 (indicated in the illustration) comprising unseparated items of laundry of the same or different types and/or sizes. In the region of the laundry conveyor 35, which is assigned to the loading station 11, automatic loading of the pneumatic conveyor takes place by the laundry being picked up by the suction head 12 and transported pneumatically, along the tubular conveying section 10, to the collecting container 13 or the like. By opening the slide 16 beneath the base opening 15 of the collecting container 13, the items of laundry can be discharged as required from this collecting container, to be precise both continuously and discontinuously to a treating arrangement. The treating arrangement may be a washing machine, a drier, a feed conveyor to a mangle or some other laundry-processing machine, as is conventional, in particular, in laundries.

The process according to the invention for automatically loading the, in particular, abovedescribed pneumatic conveyor is described in more detail hereinbelow:

In the starting position shown in FIG. 1, the suction head 12 at the bottom end of the moveable tube 31 of the telescopic tube 20 has been moved upward. The venting opening 23 is closed and the shut-off slide 26 is open. The fan 17 is in operation and, in the tubular conveyor section 10, generates an air flow in the direction of the ejecting arrangement 39. Air is taken into the tubular conveying section 10 through the suction head 12. A pile of laundry 38 is located on the loading conveyor 35.

For automatically loading the pneumatic conveyor, the suction head 12 is then lowered from the telescopic tube 20 in the direction of the top strand 36 of the loading conveyor 35 (FIG. 3). In this case, the opening 15 of the suction head 12, this opening being oriented obliquely in the direction of the pile of laundry 38, passes into the vicinity of the pile of laundry 38, which is possibly additionally transported in the direction of the suction opening 19 of the suction head 12 by the loading conveyor 35. As soon as the reflection sensors 34 in the region of the suction head 12 detect abutment of the latter against the pile of laundry 38, or a predetermined spacing of the suction opening 19 from the pile of laundry 38, any further lowering of the suction head 12 is stopped, as is any possible transportation of the pile of laundry 38 by the loading conveyor 35 in the direction of the suction head 12. Laundry, to be precise a (small) batch of laundry, is then picked up from the pile of laundry 38 and taken in through the suction opening 19 of the suction head 12 and transported along the tubular conveying section 10 into the collecting container 13. The suction head 12 is continuously adjusted here by the reflection sensor 34 in order to maintain abutment against, or a certain spacing from, the pile of laundry 38. This can take place by the suction head 12 being correspondingly lowered further by the telescopic tube 20 and/or by the loading conveyor 35 being driven further in the direction of the opening 15 of the suction head 12.

FIG. 5 illustrates the case where the suction head 12 picks up an excessively large batch of laundry, namely a plug of laundry 28, from the pile of laundry 38. The plug of laundry 28 cannot be taken in through the suction head 12. The plug of laundry 28 thus closes the suction opening 19 of the suction head 12. This is indicated by a corresponding detection means, by virtue of detection, for example, of the negative pressure in the region at least of the suction head 12 which builds up as a result of the suction opening 19 being closed by the plug of laundry 28. The suction head 12 with the plug of laundry 28 is raised here by the telescopic tube 20, by way of the pneumatic cylinders 29 being displaced. This can take place as a result of the increasing negative pressure in the tubular conveying section 10. Once the suction head 12 with the plug of laundry 28 has been moved upward, the shut-off slide 26 is closed and the venting opening 23 is opened. It is possible here for the fan 17 to remain in operation. Closing the shut-off slide 26 and opening the venting slide 23 interrupts the operation of the plug of laundry 28 being picked up by the suction head 12. That portion of the tubular conveying section 10 which extends as far as the shut-off slide 26 and, in particular, the suction head 12 are vented, as a result of which the plug of laundry 28 is released from the suction head 12 and falls down onto the loading conveyor 35. This results in the plug of laundry 28 being separated or disentangled to produce small batches of laundry. The plug of laundry 28 is separated, on the one hand, by the abrupt reduction in the negative pressure at the suction head 12 as the latter is vented and, on the other hand, by the plug of laundry 28 falling down onto the loading conveyor 35.

The shut-off slide 26 is then opened again and the venting slide 23 is closed. Thereafter, or at the same time, the suction head 12 is moved toward the pile of laundry 28 again, that is to say lowered, from the telescopic tube 20. Constituent parts of the disentangled plug of laundry 28, that is to say smaller batches of laundry with a smaller number of items of laundry, are then picked up by the suction head 12, it being possible for the smaller number of items of laundry now picked up to pass through the suction opening 19 of the suction head 12 and to be transported, as batches of laundry, along the conveying section 10 into the at least one collecting container 13.

If, in exceptional cases, it should not be possible for the plug of laundry 28 to be sufficiently separated by venting and dropping being carried out once, the abovedescribed operation of picking up the plug of laundry 28, raising it, venting it and allowing it to fall is repeated until such time as the plug of laundry 28 is separated to the extent where the laundry can be taken in through the suction head 12.

Since the collecting container 13 serves as a store for items of laundry which have been picked up, it is possible for laundry to be discharged continuously or discontinuously from the collecting container 13 to a subsequent laundry-treating arrangement irrespective of further items of laundry being picked up, in particular for the purpose of eliminating plugs of laundry 28, during automatic loading of the pneumatic conveyor.

FIG. 7 shows an alternative apparatus, which differs from the apparatus described above, and shown in FIGS. 1 to 6, essentially only by two ejecting arrangements 39 being provided in the end region of the tubular conveying section 10. In the exemplary embodiment shown, two identical ejecting arrangements 39 are arranged one beside the other. It is also possible, however, to provide different ejecting arrangements 39, to be precise in any desired set-ups relative to one another. In particular, the spacings between the ejecting arrangements 39 may be significantly greater than in FIG. 7. The tubular conveying section 10 leads to the two ejecting arrangements 39. Accordingly, the ejecting arrangement 39 which is shown on the right-hand side in FIG. 7 is also provided with an arcuate connecting portion 40. The connecting portion 40, like the connecting portion 22 leading to the first ejecting arrangement 39, opens out into the horizontal main portion 21 of the tubular conveying section 10. Located at the point where the connecting portion 22 branches off from the main portion 21 is a switch-over diverter 41, which is only schematically illustrated in FIG. 7. This diverter 41 is designed such that batches of laundry transported through the main portion 21 pass either via the connecting portion 22 to the first ejecting arrangement 39 (left-hand ejecting arrangement 39 in FIG. 7) or via the connecting portion 40 to the second ejecting arrangement 39 (ejecting arrangement 39 shown on the right-hand side in FIG. 7). The ejecting arrangements 39, which act as air locks, allow pressure-free discharge of the respective batch of laundry into the collecting containers 13 in, or downstream of, the first ejecting arrangement 39 or the second ejecting arrangement 39. It is not necessary here for each ejecting arrangement 39 to be assigned a collecting container 13. It is also possible for the batches of laundry to be supplied from one or both ejecting arrangements 39 to any other desired arrangement for transporting the batches of laundry further.

The diverter 41 can be switched over as required, with the result that the batches of laundry can be directed specifically to one ejecting arrangement 39 or the other. The laundry or batches or laundry is or are divided up as a result. This dividing-up operation can take place with either optional or specific sorting.

It is also conceivable to provide, at any location of the tubular conveying section 10, a detection and/or weighing arrangement, by means of which the respective batch of laundry can be weighed or as an alternative, or in addition, checked in respect of at least one selected property. By a corresponding activation of the switch-over diverter 41, the laundry or each batch of laundry can then be fed specifically to one of the two ejecting arrangements 39. By virtue of the batches of the laundry being weighed, it is possible for the diverter 41 to be switched over in dependence on the weight of the laundry which has been fed to the respective ejecting arrangement 39 and, for example, to the collecting container 13 assigned to the latter. It is also possible, for example, for sorting to take place in accordance with the level of moisture in the laundry, but also in accordance with other criteria.

The operation according to the invention of dividing up the laundry, in particular batches of laundry, guided through the same tubular conveying section 10 results in those leaving the tubular conveying section 10 in a specifically distributed or sorted manner at different locations, namely different ejecting arrangements 39, and thus in it being possible, for example, to use the same tubular conveying section 10 to charge a plurality of arrangements for the further processing and treatment of the laundry. The apparatus can thus be operated with better utilization of capacity, in particular laundry can be fed to a plurality of identical or different laundry-treating machines which can usually process less laundry than can be transported through the tubular conveying section 10 of the apparatus.

LIST OF DESIGNATIONS

10 Tubular conveying section
11 Loading station
12 Suction head
13 Collecting container
14 Covering wall
15 Opening
16 Slide
17 Fan
18 Vertical portion
19 Obliquely directed suction opening
20 Telescopic tube
21 Main portion
22 Connecting portion
23 Venting opening
24 Slide
25 Pneumatic cylinder
26 Shut-off slide
27 Pneumatic cylinder
28 Plug of laundry
29 Pneumatic cylinder
30 Piston rod
31 Moveable tube
32 Piston
33 Stationary tube
34 Reflection sensor
35 Loading conveyor
36 Top strand
37 Hopper
38 Pile of laundry
39 Ejecting arrangement
40 Connecting portion
41 Switch-over diverter
42 Detector

What is claimed is:

1. A process for automatically eliminating a plug of laundry blocking a suction head of a pneumatic conveyor while loading the pneumatic conveyor with the laundry, wherein the pneumatic conveyor comprises an air flow generator for forming a suction air stream for forming a negative pressure in the suction head and wherein the suction head comprises a suction opening for allowing the suction air stream to pick up items of the laundry from a loading means, comprising:
   (a) if the items of laundry picked up by the suction head form a plug of laundry that cannot be taken in through the suction head thus closing the suction opening;
   (b) then automatically interrupting the suction air stream for a brief interval therefore releasing the plug of laundry from the suction head and allowing the laundry to fall and land on the loading means, wherein the act of interrupting the suction air stream, of falling and/or of landing separates or disentangles the plug of laundry into smaller batches of the laundry;
   (c) then using the suction air stream and the suction head for picking up a smaller number of the items of laundry from the loading means; and
   (d) if the plug of laundry is not separated or disentangled into smaller batches of the laundry in step (b), then repeating (a) through (c) until the plug of laundry is broken up pneumatically so as to eliminate the plug of laundry and to prevent blockage of the suction head.

2. The process as claimed in claim 1, wherein when the plug of laundry is picked up, the plug of laundry is raised along with the suction head by way of pneumatic cylinders acting on a telescopic tube to which the suction head is connected.

3. The process as claimed in claim 1, wherein the suction head is moved in a controlled manner up to the laundry on the loading conveyor.

4. The process as claimed in claim 1, wherein the closing of the suction head by the plug of laundry is detected by a detector that generates a signal when the suction head is closed by the plug of laundry.

5. The process as claimed in claim 1, wherein, when the plug of laundry is picked up, the suction head is automatically slightly raised, the suction air stream from the suction head is interrupted for the brief interval releasing the plug of laundry from the suction head, and once the plug of laundry is released from the suction head, the suction continues again so as to prevent blockage of the suction head.

6. A process for automatically eliminating a plug of laundry blocking a suction head of a pneumatic conveyor while loading the pneumatic conveyor with the laundry, wherein the pneumatic conveyor comprises an air flow generator for forming a suction air stream for forming a negative pressure in the suction head and wherein the suction head comprises a suction opening for allowing the suction air stream to pick up items of the laundry from a loading means, comprising:

(a) when the items of laundry are picked up, the items of laundry are raised along with the suction head by way of pneumatic cylinders acting on a telescopic tube to which the suction head is connected so as to create a distance between the items of laundry and the loading means;

(b) if the items of laundry picked up by the suction head form a plug of laundry that cannot be taken in through the suction head thus closing the suction opening;

(c) then automatically interrupting the suction air stream for a brief interval and simultaneously venting the suction head therefore releasing the plug of laundry from the suction head and allowing the laundry to fall and land on the loading means, wherein the act of interrupting the suction air stream, of falling and/or of landing separates or disentangles the plug of laundry into smaller batches of the laundry;

(d) then using the suction air stream and the suction head for picking up a smaller number of the items of laundry from the loading means; and (e) if the plug of laundry is not separated or disentangled into smaller batches of the laundry in step (c), then repeating (a) through (d) until the plug of laundry is broken up pneumatically so as to eliminate the plug of laundry and to prevent blockage of the suction head.

7. The process as claimed in claim 6, wherein the suction head is moved in a controlled manner up to the laundry on the loading conveyor.

8. The process as claimed in claim 7, wherein the closing of the suction head by the plug of laundry is detected by a detector that generates a signal when the suction head is closed by the plug of laundry.

9. The process as claimed in claim 8, wherein, when the plug of laundry is picked up, the suction head is automatically slightly raised, the suction air stream from the suction head is interrupted for the brief interval releasing the plug of laundry from the suction head, and once the plug of laundry is released from the suction head, the suction continues again so as to prevent blockage of the suction head.

* * * * *